United States Patent Office 3,261,725

Patented July 19, 1966

3,261,725

DEVICE COMPRISING A III–V COMPOUND SEMI-CONDUCTOR BODY AND AT LEAST ONE CONTACT TO SAID BODY

Lawrence Reginald David Jenkins, Southampton, Hants, England, assignor to North American Philips Company, Inc., New York, N.Y., a corporation of Delaware No Drawing. Filed Mar. 20, 1963, Ser. No. 266,507
Claims priority, application Great Britain, Mar. 21, 1962, 10,914/62
8 Claims. (Cl. 148—33)

The present invention relates to a device, e.g., a semi-conductor device such as a transistor, diode, photo-cell, or Hall-device, comprising a semi-conductor body, consisting of a compound of the type $A^{III}B^{V}$, and at least one contact to said body, and further relates to a method of providing such a contact to such a semi-conductor body.

The term "a compound of the type $A^{III}B^{V}$" is to be understood to mean herein a compound of one of the elements boron, aluminum, gallium and indium of the third main group of the periodic system of the elements and one of the element nitrogen, phosphorus, arsenic and antimony of the fifth main group of the periodic system of the elements, or a mixed crystal of two or more of these compounds.

The present invention has for its object to provide for an improved composition of alloy-contacts onto semi-conductor bodies of the type referred to. According to the invention the basic material of the contact has the following composition:

2% to 25% by weight of lead;
0% to 4% by weight of tin;
0% to 2% by weight of cadmium;

and the balance of indium, and may have the following composition:

2% to 10% by weight of lead;
86% to 95% by weight of indium;
0% to 2% by weight of tin; and
0% to 2% by weight of cadmium.

The semi-conductor body may consist of an indium compound of the $A^{III}B^{V}$ type, for example, indium antimonide, and the contact may provide an ohmic connection to semi-conductive material of p-type conductivity. A conducting member may be connected to the contact, consisting of platinum or tinned copper.

In order to improve wetting, the body of semi-conductive material may be provided, before alloying the contact material, with a metal plating, for example, of copper, gold or platinum, at the surface area at which the contact is to be made.

Semi-conductive bodies of the type referred to, in general, have low coefficients of thermal expansion compared with metals and are brittle. The composition-range according to the invention is particularly useful for gravity alloying contacts to semi-conductor bodies specially for use at low temperatures since the brittleness is more apparent at low temperatures and with the conventional tin-lead solders the chance of fracture of the semi-conductive bodies is high.

In general, the contact material become less ductile with decrease in temperature and it is preferred to select its composition, and hence the coefficient of thermal expansion and ductility of the solder, with reference to the lowest temperature at which use is intended. It is found that for use at the temperature of liquid hydrogen, the quantities of cadmium and tin can be about 1% by weight, the quantity of lead being less than 10% by weight.

Further features and details of the present invention will be clear from modes of carrying out the invention given below by way of example.

Lead and indium of analytical grade purity in the amounts of 0.25 g. and 0.88 g. respectively, are placed in a silica crucible and heated to a temperature of 450° C. provide on cooling a lead-indium alloy. The alloy, which can be drawn or rolled into wire form, can be used directly for forming alloy contacts to semi-conductor bodies of the type referred to.

A wafer of indium antimonide 8 mms. x 1 mm. x 150$\mu$, of p-type conductivity and having a resistivity of 9 ohm-cm. has two contacts attached to it so that they are provided by alloying the lead-indium alloy described above onto the wafer. Two platinum wires, parallel to each other, are attached, each to a different one of the contacts. The alloy may be picked up from a melt on the platinum wires dipped briefly into the melt, the alloy-bearing wires being positioned on the wafer and the whole heated on a hot-plate, having an aluminum surface on which the wafer rests, to effect the alloying of the contacts. The contacts are ohmic to the indium antimonide body. The indium antimonide body is thereafter mounted and associated with cooling means to provide an infra-red sensitive, photo-conductive cell suitable for use at temperatures down to about the temperature of liquid nitrogen or hydrogen.

Flux may be used in the alloying process and it has been found that those fluxes with a hydrochloric acid base, for example, consisting of concentrated hydrochloric acid, glycerol and demineralized water in the proportions by volume of 1:2:1, appear preferable. Wetting is enhanced if the indium antimonide is metal plated; for example, with copper, gold or platinum, at the surface area at which the soldered connection is to be made, thus providing for improved wetting limited to the area covered by the metal plating.

The following general considerations apply in connection with the selection of a contact material for making an indium antimonide device for a particular use:

(a) As the proportion of tin increases so does the wetting characteristic of the solder but the brittleness of the solder and any connection made with its use also increases.

(b) As the proportion of lead increases the deeper the recrystallized alloy zone made during soldering penetrates into the indium antimonide but the lower is the ductility of the solder and the less highly p-type is the recrystallized zone. In this connection, it is mentioned that if pure indium were to be used as the solder, wetting is poor and due to the phase diagram of indium-antimony, indium additional to the equal atomic ratio tends to be rejected so that alloying effected by soldering is confined to a thin layer near the surface of the indium antimonide body.

(c) The incorporation of cadmium in the solder enhances the low temperature suitability for a device to be used at very low temperatures.

Examples of two other compositions by weight of solder, which may be prepared and used in a manner similar to that described above are:

(i)

20% lead;
78% indium; and
2% tin and (ii)

8% lead;
90% indium;
1% tin; and
1% cadmium.

What is claimed is:

1. A semiconductor device comprising a semiconductive body of a compound of one of the elements selected from the group consisting of boron, aluminum, gallium and indium with one of the elements selected from the group consisting of nitrogen, phosphorus, arsenic and antimony, and mixed crystals thereof, a contact surface alloyed to said body and comprising a basic material containing 2%–25% by weight of lead, up to 4% by weight of tin, up to 2% by weight of cadmium, the balance of indium.

2. A device as set forth in claim 1 wherein the compound comprises about 20% lead, about 78% indium, and about 2% tin.

3. A device as set forth in claim 1 wherein the compound contains indium.

4. A semiconductor device comprising a semiconductive body of a compound of one of the elements selected from the group consisting of boron, aluminum, gallium and indium with one of the elements selected from the group consisting of nitrogen, phosphorus, arsenic and antimony, and mixed crystals thereof, a contact surface alloyed to said body and comprising a basic material containing 2%–25% by weight of lead, up to 4% by weight of tin, up to 2% by weight of cadmium, the balance of indium, and a conducting member selected from the group consisting of platinum and tinned copper connected to said contact.

5. A semiconductor device adapted for use at low temperatures below room temperature, comprising a semiconductive body of a compound of one of the elements selected from the group consisting of aluminum, gallium and indium and one of the elements selected from the group consisting of nitrogen, phosphorus, arsenic and antimony, and mixed crystals thereof, a contact surface alloyed to said body and comprising a basic material containing 2%–10% by weight of lead, up to 2% by weight of tin, up to 2% by weight of cadmium, and 86%–95% by weight of indium, and a conducting member selected from the group consisting of platinum and tinned copper connected to said contact.

6. A device as set forth in claim 5 wherein the contact comprises about 8% lead, about 90% indium, about 1% tin and about 1% cadmium.

7. A device as set forth in claim 5 wherein the compound is indium antimonide.

8. A device as set forth in claim 7 wherein the compound exhibits p-type conductivity, and the contact constitutes an ohmic connection thereto.

References Cited by the Examiner

UNITED STATES PATENTS

| | | | |
|---|---|---|---|
| 2,796,368 | 6/1957 | Jenny | 148—185 |
| 2,836,523 | 5/1958 | Fuller | 148—185 |
| 2,837,448 | 6/1958 | Thurmond | 148—185 |
| 3,005,735 | 10/1961 | Schnable | 148—185 |
| 3,041,508 | 6/1962 | Henkel et al. | 148—33 |
| 3,063,876 | 11/1962 | Le May et al. | 148—185 |
| 3,088,856 | 5/1963 | Wannlund et al. | 148—185 |
| 3,184,303 | 5/1965 | Grobin | 29—195 |

OTHER REFERENCES

Hansen, "Constitution of Binary Alloys," 1958, published by McGraw-Hill Book Co., Inc., New York, N.Y., pp. 854–856 relied on.

DAVID L. RECK, *Primary Examiner.*

HYLAND BIZOT, *Examiner.*

R. O. DEAN, *Assistant Examiner.*